United States Patent
Wuthrich

[15] 3,704,582
[45] Dec. 5, 1972

[54] INDEXING MECHANISM FOR HOROLOGICAL INSTRUMENT
[72] Inventor: Paul Wuthrich, Watertown, Conn.
[73] Assignee: Timex Corporation, Waterbury, Conn.
[22] Filed: Oct. 15, 1970
[21] Appl. No.: 80,871

[52] U.S. Cl. ........................ 58/28 D, 58/116, 74/1.5
[51] Int. Cl. ............................................... G04c 3/04
[58] Field of Search ........... 58/28, 28 A, 28 B, 28 D, 58/116 M; 74/1.5

[56] References Cited

UNITED STATES PATENTS 3,312,053   4/1967   Takamune et al. ........ 58/28 R
3,298,170   1/1967   Meitinger et al. .......... 58/28 R

*Primary Examiner*—Richard B. Wilkinson
*Assistant Examiner*—Edith C. Simmons Jackmon
*Attorney*—Richard A. Joel

[57] ABSTRACT

A horological instrument such as a watch includes an indexing mechanism or dial train drive for transmitting power from an oscillating balance wheel to an index wheel. The index wheel drives the gear train of a watch. The balance wheel oscillates a lever between two end positions and one or more pins mounted on the lever alternately engage the teeth of the index wheel stepping the index wheel in the desired direction. The index wheel is held in a rest position at the end of each step by indexing magnets which are arranged to exert a predetermined torque on the wheel and to hold the lever in its banking or end positions.

2 Claims, 4 Drawing Figures

PATENTED DEC 5 1972

INVENTOR.
PAUL WUTHRICH
BY
Richard H. Joel
ATTORNEY

INDEXING MECHANISM FOR HOROLOGICAL INSTRUMENT

BACKGROUND OF THE INVENTION

The present invention relates to horology and more particularly to an indexing arrangement for watches.

In conventional indexing systems, magnets are often provided to step or hold the index wheel, see patents discussed below. However, indexing systems being such an important element of a watch, has meant that the cost and accuracy thereof are readily translated into the end product. This new and improved indexing system relates the positioning of magnets to the index wheel draw faces to provide a highly efficient system for stepping and holding the index wheel.

The prior art includes U.S. Pat. No. 3,462,942 to Josef Egger and Heinz Meitinger which disclosed a now common dial train drive in which an oscillating balance wheel drives a lever to and from in order to stop an index wheel. A magnet is provided for each step of circular pitch of the index wheel so that a direct or indirect magnetic influences holds the lever as well as the index wheel. Meitinger U.S. Pat. Nos. 3,298,170 and 3,396,531 are also of interest in this area.

Other patents representative of the prior art are U.S. Pat. No. 3,122,879 to K. Trick, et al. and U.S. Pat. No. 3,312,053 to H. Takamune, et al. Also of interest is applicants copending application, Ser. No. 23,145, filed Mar. 27, 1970.

SUMMARY OF THE INVENTION

The present invention pertains to an indexing mechanism for electric or electronic timepieces wherein the balance wheel assembly drives an index lever causing oscillation thereof. A pair of spaced apart index pins are mounted on the arms of the index lever to alternately engage the teeth of an index wheel advancing each tooth by one-half pitch.

The index wheel is held in its rest position at each of its one-half pitch steps by one or more indexing magnets. The indexing magnets are skewed to provide a predetermined torque on the index wheel teeth. The index lever, which is in engagement with the draw faces of the index wheel teeth, is thus held in its banking or end position at the end of each step through this magnetic action.

It is an object of this invention to provide a new and improved indexing mechanism for timepieces.

It is another object of this invention to provide a unique indexing mechanism for timepieces including magnet means for holding the index lever in its banking positions.

Other objects and advantages of the present invention will be more clearly seen when viewed in conjunction with the accompanying drawings wherein.

DETAILED DESCRIPTION OF THE INVENTION

Figure 1:
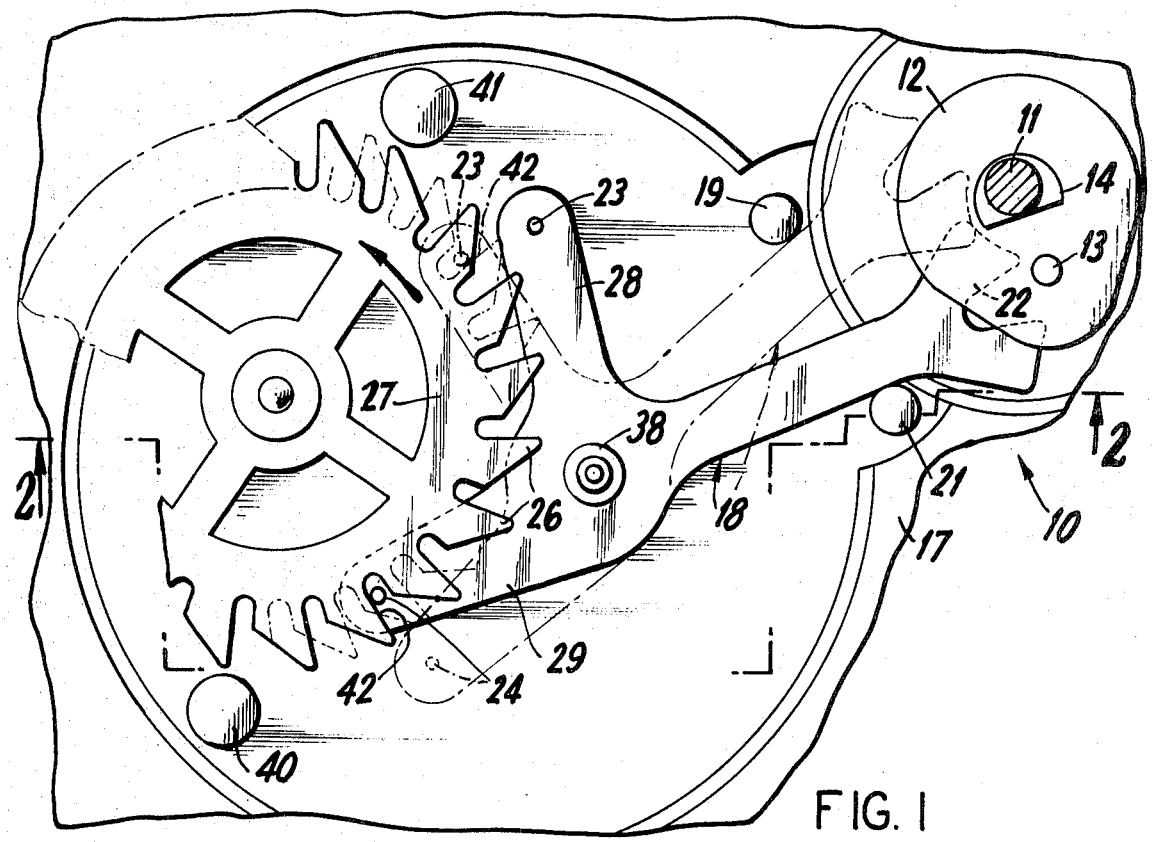
FIG. 1 is a top plan view of a schematic representation of the invention.

The driving of an indexing mechanism or dial train by the balance wheel and the transmission of the balance wheel's motion by a lever to an index wheel are known. The representation of these parts is, therefore, only shown schematically in the drawing. Furthermore, the impulsing of the balance wheel either electrically or electronically, and the transmission of the motion of the index wheel to the train is also known and, therefore, omitted from the drawing.

The indexing mechanism shown in the drawings comprises a balance wheel assembly 10 mounted about a balance staff 11. The balance staff 11 includes safety roller 14 and is journaled for rotation in bearing means 16 in frame 17. The balance wheel assembly 10 also includes an impulse disk 12 having an impulse pin 13 extending downward therefrom.

The impulse pin 13 engages the fork portion 22 of index lever 18 as the impulse disk 12 oscillates back and forth with the balance wheel (not shown). The index lever 18 is mounted about arbor 38 which is journaled at its end portions in the front frame 17 and train bridge 39 respectively. The lever 18 oscillates between banking pins 19 and 21 as the index pins 23 and 24 are mounted respectively on arms 28 and 29 of the lever 18 to affect the movement of the index wheel 27 as shown in phantom in FIGS. 1 and 3. Each index pin advances the index wheel 27 by one-half pitch during each half oscillation of the lever 18.

Figure 2:
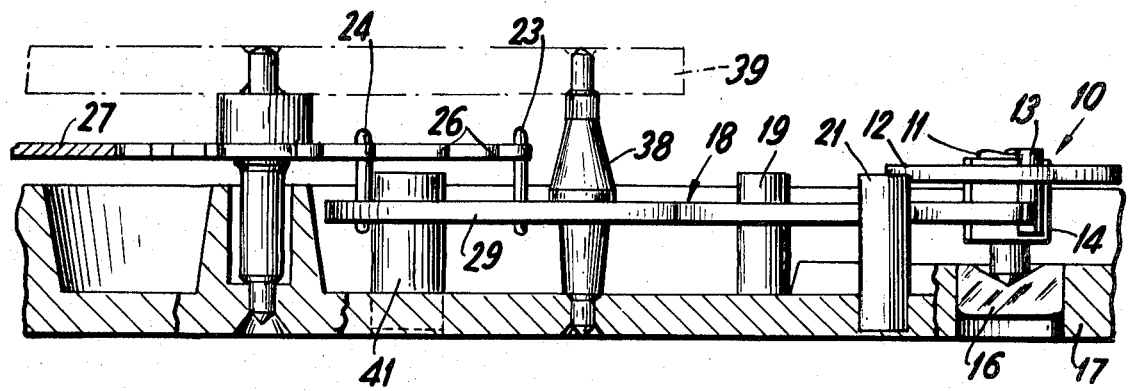
FIG. 2 is a partially cross-sectioned side view taken along the lines 2—2 of FIG. 3.

In the embodiment of FIGS. 1 and 2, the indexing magnets 40 and 41 are skewed to exert a forward torque in the direction of index wheel movement on the lever draw faces 42. This action holds the lever 18 in an end position against the banking pin 21 or, as shown in phantom, against banking pin 19. The lever 18 must be held momentarily in its banked position to permit functioning of the indexing system and to prevent any reverse movement thereof.

Figure 3:
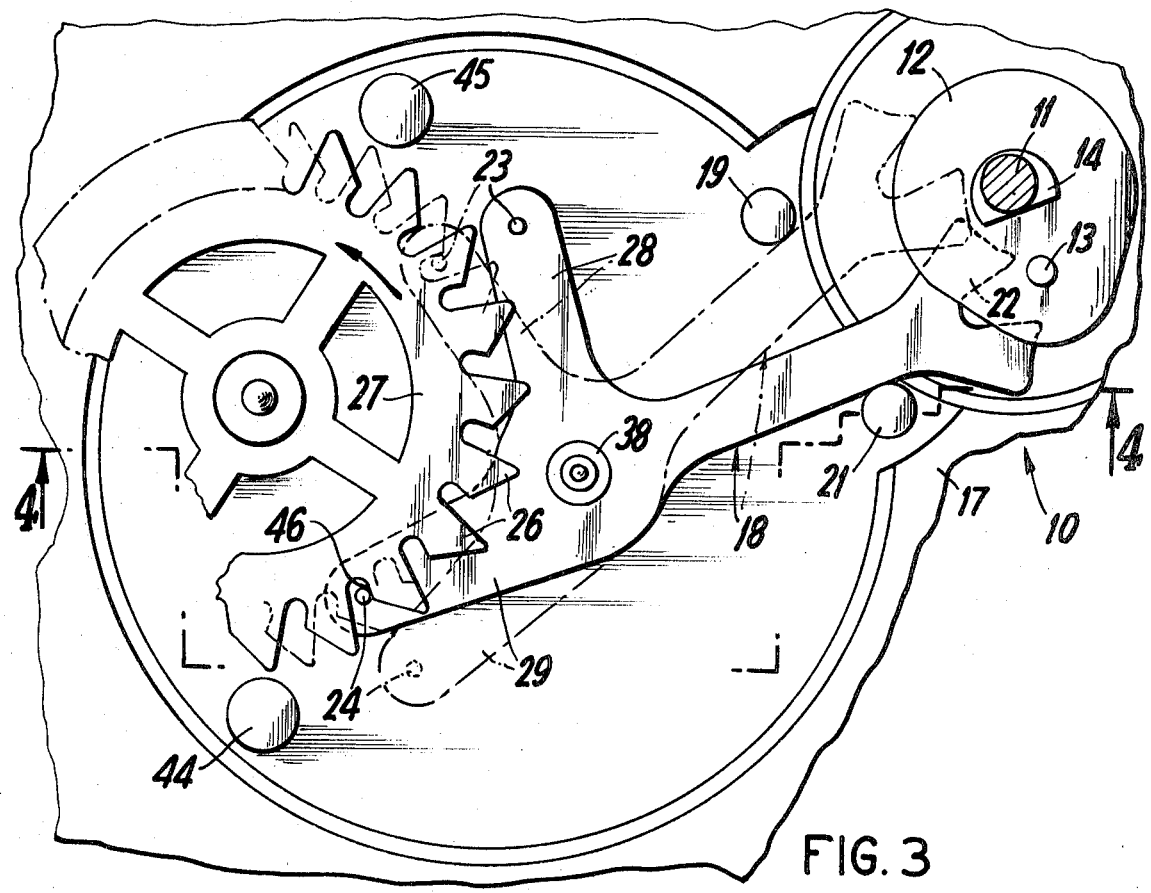
FIG. 3 is a top plan view of a second embodiment of the invention.
Figure 4:
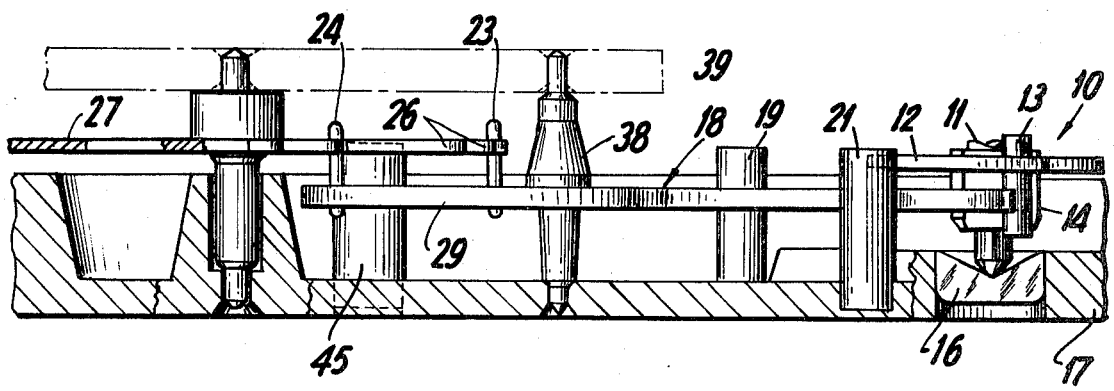
FIG. 4 is a partial cross-section view taken along the lines 4—4 of FIG. 3.

The embodiment of FIGS. 3 and 4 is similar to that of FIGS. 1 and 2, the distinction residing in the magnets 44 and 45 which are skewed to provide a reverse torque on the index wheel. The reverse torque acts against the draw faces 46 of the index wheel teeth 26 to hold the lever 18 in a banked position against pin 21 or, as shown in phantom, pin 19. The magnetic torque is applied in a direction opposite to the normal movement of the index wheel 27.

In operation, the impulse pin 13 intermittently engages the forked end position 22 of the index lever 18 during oscillation of the balance wheel assembly 10. The lever 18 is thus oscillated back and forth between banking pins 19 and 21 while the index pins 23 and 24 engage the teeth 26 of the index wheel 27. The pins 23 and 24 advance the index wheel 27 in one-half pitch steps in the indicated direction.

The index wheel 27 which is of ferro-magnetic material is held in its rest position at the end of each one-half pitch step by two or more indexing magnets, 40 and 41 in FIGS. 1 and 2 and 44 and 45 in FIGS. 3. While only two magnets are shown in each embodiment, it is to be understood that a plurality of magnets could be used. As described previously, the magnets 40 and 41 are selected and positioned to exert a forward torque on the draw faces 42 to hold the lever 18 at the end of each one-half pitch step. On the other hand, the magnets 44 and 45 are selected and positioned to provide a reverse torque on the draw face 46 to hold the lever 18 in a banked position.

The invention as thus described above permits the precise indexing required in a watch. Furthermore, the system functions with a minimum of parts to provide the desired indexing.

It is to be understood that the above-described arrangements are merely illustrative examples of the application of the principles of the invention. Numerous other arrangements may be readily devised by those skilled in the art which will embody the principles of the invention and fall within the spirit and scope thereof.

What is claimed is:

1. An indexing mechanism for timepieces comprising:

a frame, an oscillatory timing wheel rotatably mounted to the frame, means to impulse the timing wheel to provide oscillatory movement thereof, an index lever rotatably mounted to the frame and oscillated by the timing wheel, an index wheel having a plurality of teeth positioned about its periphery to be engaged by the index lever and advanced in predetermined steps, magnet means positioned adjacent the index wheel teeth to hold the index wheel at the end of each step by exerting a directed torque on the index wheel teeth, the magnet means comprising a pair of spaced-apart magnets which are skewed in a predetermined manner said magnets being designed to interact with the teeth of the index wheel locking the pins of the index lever against the forward draw faces by exerting a forward torque on the teeth, at least two banking pins mounted to the frame at spaced intervals on opposite sides of the index lever to limit the movement thereof, and, the index lever includes bifurcated end portions, one of said end portions having a pair of arms and an index pin mounted to each arm to alternately engage the index wheel teeth advancing the index wheel an amount equal to one-half the tooth pitch during each engagement, and, the index wheel teeth include shaped draw faces to be engaged by the index pins.

2. An indexing mechanism for timepieces comprising:

a frame, an oscillatory timing wheel rotatably mounted to the frame, means to impulse the timing wheel to provide oscillatory movement thereof, an index lever rotatably mounted to the frame and oscillated by the timing wheel, an index wheel having a plurality of teeth positioned about its periphery to be engaged by the index lever and advanced in predetermined steps, magnet means positioned adjacent the index wheel teeth to hold the index wheel at the end of each step by exerting a directed torque on the index wheel teeth, the magnet means comprising a pair of spaced-apart magnets which are skewed in a predetermined manner said magnets being designed to interact with the teeth of the index wheel locking the pins of the index lever against the reverse draw faces by exerting a reverse torque on the teeth.

at least two banking pins mounted to the frame at spaced intervals on opposite sides of the index lever to limit the movement thereof, and, the index lever includes bifurcated end portions, one of said end portions having a pair of arms and an index pin mounted to each arm to alternately engage the index wheel teeth advancing the index wheel an amount equal to one-half the tooth pitch during each engagement, and, the index wheel teeth include shaped draw faces to be engaged by the index pins.

* * * * *